United States Patent [19]

Priaroggia

[11] Patent Number: 4,722,588

[45] Date of Patent: Feb. 2, 1988

[54] JOINT FOR OPTICAL FIBER SUBMARINE CABLES

[75] Inventor: Paolo G. Priaroggia, Milan, Italy

[73] Assignee: Societa' Cavi Pirelli S.p.A., Milan, Italy

[21] Appl. No.: 831,654

[22] Filed: Feb. 20, 1986

[30] Foreign Application Priority Data

Mar. 1, 1985 [IT] Italy ................ 19736 A/85

[51] Int. Cl.⁴ .................. G02B 6/38; H02G 3/00
[52] U.S. Cl. ................ 350/96.21; 350/96.20; 350/96.22; 350/96.23; 174/70 R
[58] Field of Search ........ 350/96.10, 96.20, 96.21, 350/96.22, 96.23; 174/70 S, 70 R

[56] References Cited

U.S. PATENT DOCUMENTS

| | | | |
|---|---|---|---|
| 4,261,721 | 4/1981 | Lewis | 350/96.22 X |
| 4,348,076 | 9/1982 | Oldham | 350/96.22 |
| 4,545,645 | 10/1985 | Mignien | 350/96.21 |
| 4,640,576 | 2/1987 | Eastwood et al. | 350/96.23 |
| 4,657,343 | 4/1987 | Oldham et al. | 350/96.23 |
| 4,676,590 | 6/1987 | Priaroggia | 350/96.23 |
| 4,688,889 | 8/1987 | Pasini et al. | 350/96.23 |
| 4,690,498 | 9/1987 | Priaroggia | 350/96.23 |
| 4,697,875 | 10/1987 | Priaroggia | 350/96.23 |

FOREIGN PATENT DOCUMENTS

| | | | |
|---|---|---|---|
| 56-6201 | 1/1981 | Japan | 350/96.23 |
| 2124038 | 2/1984 | United Kingdom | 174/70 S |

Primary Examiner—William L. Sikes
Assistant Examiner—Brian M. Healy
Attorney, Agent, or Firm—Brooks Haidt Haffner & Delahunty

[57] ABSTRACT

A joint for interconnecting a pair of optical fiber, submarine cables which have a central armor sufficient to withstand tensile stresses applied to the cables during use, i.e., laying, recovery and operation, which have optical fibers loosely disposed in channels in a plastic layer around the central armor and which have all otherwise empty spaces filled with a substantially incompressible fluid. The joint comprises a metal ferrule or a weld mechanically interconnecting the ends of the armors of the cables. A plastic joint sheath surrounds the interconnection of the armors and has channels which interconnect the respective channels of the cables. The optical fibers are loosely received in and interconnected within the joint sheath channels. Any otherwise empty spaces within the plastic joint sheath are filled with a substantially incompressible fluid. The cables and the joint sheath are without external armor which, by itself, can withstand the tensile stresses and hydrostatic pressures to which the cables are subjected during use.

7 Claims, 2 Drawing Figures

JOINT FOR OPTICAL FIBER SUBMARINE CABLES

BACKGROUND OF THE INVENTION

The present invention relates to a joint for optical fiber, telecommunication, submarine cables. In particular, the present invention refers to a joint for optical fiber, telecommunication, submarine cables of the type provided with a plastic material sheath and in which the sole mechanically resistant armor which is provided occupies the radially innermost zone of the cables themselves.

By means of the joints according to the invention, it is possible to connect, for example, the cables described in my copending U.S. application, Ser. Nos. 831,650 and 831,998 filed on Feb. 20, 1986 and entitled, respectively, "Pressure Resistant Submarine Optical Fiber Cable" and "Pressure Resistant Optical Fiber Cable" which illustrate cables of the type previously mentioned.

Joints for optical fiber submarine cables require great care in their making and construction. In fact, they have to provide perfect connections between the optical fiber ends, in addition to protecting the fibers and their connections from suffering very small mechanical stresses under the action of the hydrostatic pressure and under the tension stresses applied to the cable during its laying.

Therefore, it is important that the joints have a structure which, in addition to protecting the optical fibers, facilitates to the greatest extent the connections between the fibers. Further, it is important that the presence of the joints do not cause problems during the laying operations of a submarine cable including said joints.

In order to reduce these problems, it is necessary that the following conditions will be met:

(1) the outer dimensions of the outer diameter of the joints must be substantially equal to the outer dimensions of the diameter of the cable lengths connected by said joints;

(2) the flexibility of the joints must differ from that of the cable lengths connected by said joints as little as possible; and (3) the weight of the joint must be kept, to the minimum.

Moreover, it is important that the sheath of the joints does not suffer damage due to a greater thermal expansion of the elements contained therein, for example, due to sun exposure while awaiting their laying, the materials forming the sheath being different from the materials of the elements enclosed by the sheath.

SUMMARY OF THE INVENTION

One object of the present invention is that of providing joints for optical fiber, telecommunication, submarine cables which solve in an optimum manner the above-stated problems. In particular, the object of the present invention is obtained by joints which provide a very good mechanical protection to the optical fibers and to their connections, which have a great flexibility and a light weight and which permit an easy realization of the connections between the optical fiber ends and thereby provide an optimum reliability for said connections and eliminate risks of damage to their sheaths if they are subjected to thermal variations.

The principle object of the present invention is a joint for optical fiber, telecommunication, submarine cables of the type in which a sheath of plastic material encloses a core in which any cavities are filled with a substantially-incompressible fluid, the optical fibers being loosely housed in the core. A mechanically resistant armor occupies the radially innermost zone of the core and said joint is characterized by the fact of comprising a mechanical connection which joins the armors of the cables in abutting relation, connections between the ends of the optical fibers projecting from the cables and enclosed in a body of plastic material in which cavities not filled by the fibers are filled with a substantially incompressible fluid, said cavities extending in the longitudinal direction of the joint, and a sheath of plastic material which encloses said body and matches its radially outermost surface, said joint being devoid of any water tight metal sheath and any mechanically resistant amor outside of and surrounding the zone where the optical fibers and their connections are disposed.

The term "substantially incompressible fluid" used in this disclosure means liquid substances, preferably viscous and having a high viscosity, and such term excludes gases.

Other objects and advantages of the present invention will be apparent from the following detailed description of the presently preferred embodiments thereof, which description should be considered in conjunction with the accompanying drawings in which:

DETAILED DESCRIPTION OF THE INVENTION

In general, the joints according to the invention are suitable for connecting two lengths of optical fiber, submarine cables of the type provided with a sheath of plastic material and a mechanically resistant armor which occupies the radially innermost portion of a plastic material core, any otherwise empty cavities being filled with a substantially incompressible fluid, and the core housing the optical fibers in a loose manner.

Figure 1:
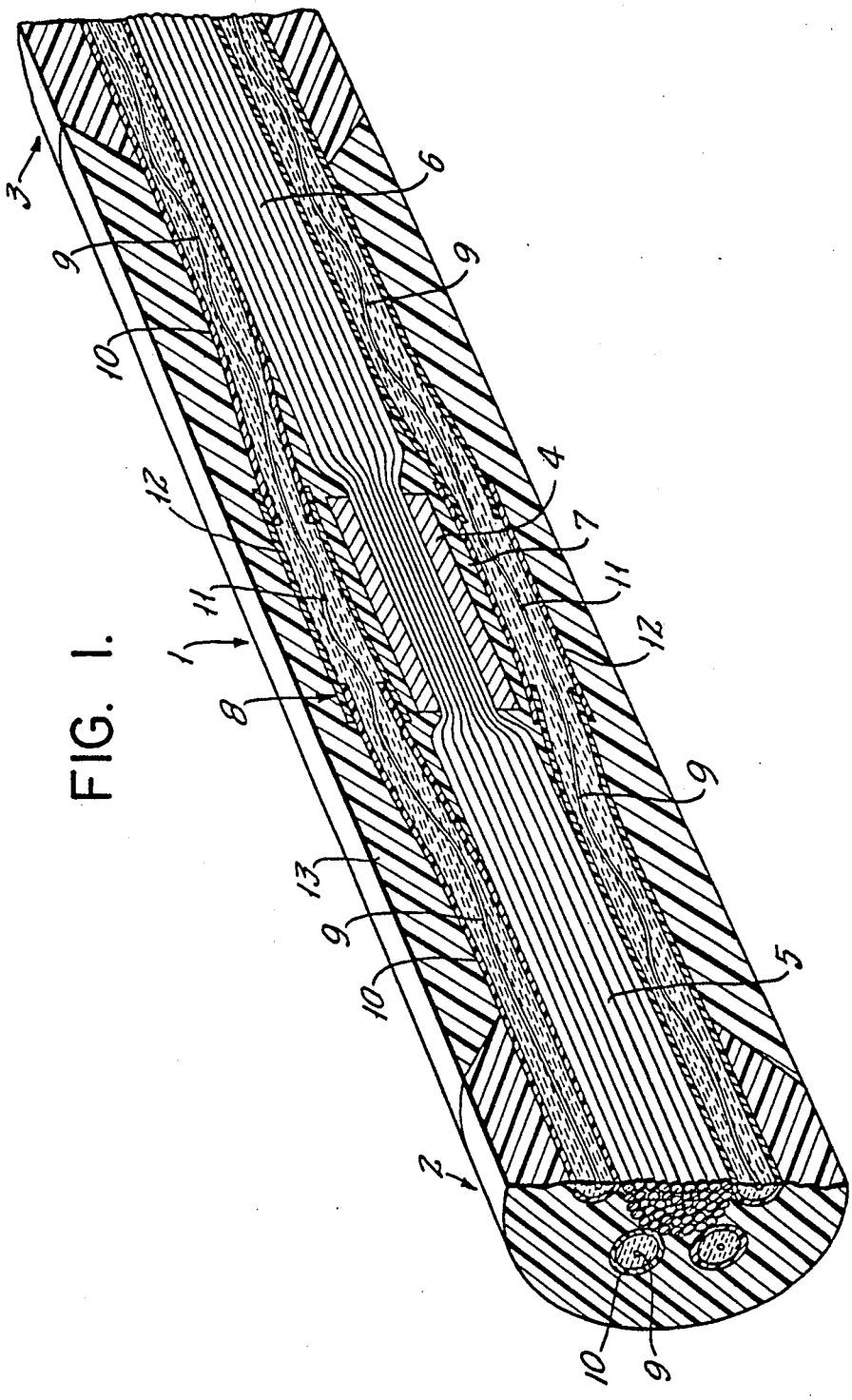
FIG. 1 shows, in perspective and in longitudinal section, a joint according to the invention.

FIG. 1 illustrates a joint according to the present invention which connects two lengths of cable of the type described above.

In particular, the joint 1 shown in FIG. 1 is particularly suitable for connecting the cables 2 and 3 of the type described in said copending application, Ser. No. 831,998, the ends of which have been previously prepared by stepwise stripping of the components.

The joint 1 comprises from the inside toward the outside, the elements described hereinafter.

A mechanical connection, constituted by a metal ferrule 4, secures the ends of the armors 5 and 6 of the cables 2 and 3 in abutting relation. The armors 5 and 6 are formed by compact anti-torsional ropes in which the spaces among the component wires are filled with a substantially incompressible fluid, for example, petroleum jelly, silicone greases and the like. Also, any spaces between the ferrule 4 and the armors 5 and 6 are filled with the same substantially incompressible fluid.

The metal ferrule 4 shown in FIG. 1 has the same outer diameter as the uncompressed armors 5 and 6, but it will be understood that the ferrule can also have a different diameter. As an alternative, the mechanical connection between the armors 5 and 6 may be constituted by a work-hardened welding and the like.

In any event, the material and size of the mechanical connection must be selected so as to withstand all the tension stresses applied to the joint during the laying or during the recovering of the cable and has, if needed, the function of carrying out an electrical connection between the armors 5 and 6 when they are used to convey electrical power, for example, by including a metallic element of high conductivity, such as one or a plurality of copper wires and the like.

A layer 7 of plastic material is placed on the ferrule 4 and on the stripped ends of the armors 5 and 6. The plastic materials for the layer 7 can be, for example, a polyolefin, such as, polyethylene and polypropylene, an aliphatic polyamid and the like.

Preferably, the layer 7 has a spindle-like shape. The connections 8 of the optical fibers 9 and the extremities of the tubes 10 of the cables which are filled with a substantially incompressible fluid and loosely house the optical fibers, bear against the layer 7.

The connections 8 comprise a butt-weld 11 between the ends of the optical fibers 9 of the cables 2 and 3, and a sleeve 12, filled with a substantially incompressible fluid, in the extremities of which the extremities of the tubes 10 of the cables 2 and 3 are inserted.

The sleeve 12 is, for example, made of plastic material or may be made of other materials. The assembly formed by the layer 7, tubes 10. and sleeves 12 constitutes a joint body of plastic material.

A sheath of plastic material 13 connects the plastic sheaths of the cables 2 and 3 to each other and has an outer diameter equal to the outer diameters of the cable sheaths. The sheath 13 embeds the extremities of the tubes 10 and the sleeves 12 connecting said tubes 10, and the innermost surface of the sheath 13 contacts the surface of the layer 7 which is not contacted by the assemblies formed by the pairs of tubes 10 and the sleeves 12.

The plastic materials for the sheath 13 of the joint can be, but not necessarily be, those set forth as used for the layer 7.

Preferably, the layer 7 and the sheath 13 are made of aliphatic polyamid because these materials, due to their mechanical characteristics, make the joint radially less compressible and thereby avoid very small variations of the diametric dimensions of the tubes 10 and the sleeves 12 and hence, possible longitudinal movement of the substantially incompressible fluid filling said tubes 10.

According to an alternative embodiment of the joint of FIG. 1, the layer 7 is omitted. In this alternative embodiment, the tubes 10, connected in pairs by the sleeves 12, are in direct contact with the ferrule 4 and with the extremities of the stripped armors 5 and 6 of the cables. Consequently, the joint sheath 13 of plastic material, which embeds said tubes 10 and said sleeves 12, mates, at its own radially innermost surface, the ferrule 4 and the extremities of the armors 5 and 6.

In the embodiment of FIG. 1 and in the alternative embodiment, the assembly formed by the pairs of tubes 10 and sleeves 12 gives rise, within the joint, to a plurality of through cavities extending in longitudinal direction along the joint, and such cavities are filled with a substantially incompressible fluid. Within the joint, there are no spaces free from material.

Around the joint sheath 13 of plastic material, there can be present other coverings, such as, for example, an anti-teredine protection of a type known per se, in the cases where the cables connected by the joint have such coverings, but said further coverings must not provide either a water-tight metal sheath for the joint or a mechanically resistant outer armor, surrounding the zone of the joint in which the optical fibers and their connections are arranged, which, by itself, is sufficient to withstand the hydrostatic pressure or the tensile stresses to which the cables are subjected.

Figure 2:
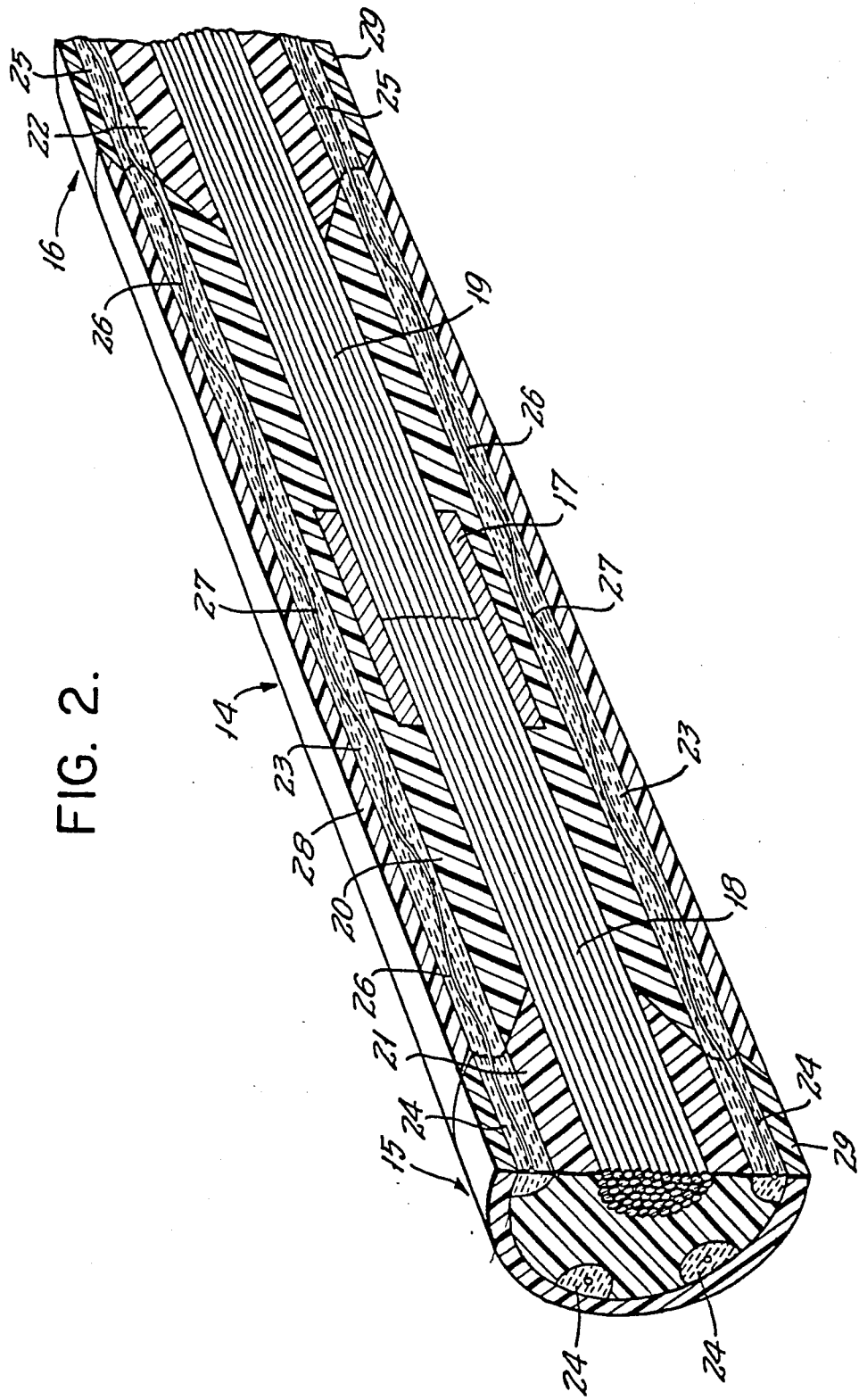
FIG. 2 shows, in perspective and in longitudinal section, an alternative embodiment of a joint according to the invention.

FIG. 2 shows an alternative embodiment according to the invention. This alternative embodiment is particularly suitable, but not so limited as pointed out hereinafter, for connecting together two cable lengths described in said copending application Ser. No. 831,650. The following description will identify the essential components of such cables which have been stripped stepwise at their extremities for forming the joint.

As shown in FIG. 2, the joint 14 which connects the cables 15 and 16 together comprises a metal ferrule 17, or a workhardened welding and the like, which mechanically connects the armors 18 and 19 of the cables in abutting relation.

The ferrule 17 is selected so as to withstand all the tension stresses at the joint during the laying or the recovery of the cable and, if needed, said ferrule has also the function of providing an electrical connection between the armors 18 and 19 of the cables.

Within the ferrule 17, all spaces not occupied by the armors of the cables are filled with the same substantially incompressible fluid, e.g. petroleum jelly, silicone grease and the like, which fills all spaces between the wires of the armors. A tubular layer 20 of plastic material, for example, a polyolefin or preferably, an aliphatic polyamid covers and is bonded to the ferrule 17 and to the extremities of the armors 18 and 19 of the cables.

The layer 20, which is also bonded to the cores 21 and 23 of plastic material of the cables 15 and 16, has, on its own radially outermost surface, a plurality of grooves 23 filled with a substantially incompressible fluid and constitutes the body of plastic material of the joint. Each groove 23 connects a groove 24 of the cable 15 to a groove 25 of the cable 16, both of which are filled with a substantially incompressible fluid.

The ends of the optical fibers 26 of the cables, which are loosely housed in the grooves 24 and 25, project from the latter for a length, for example, a length greater than that necessary for their connections. The ends of the optical fibers 26 are housed in the grooves 23 of the tubular layer 20 and are butt-welded at point 27 so as to provide connections between the optical fibers of the cables.

The joint sheath 28 of plastic material is provided around the tubular layer 20. Said sheath 28, for example, made of a polyolefin or preferably, an aliphatic polyamid, has, at its own radially outermost surface, the same diameter as the outer diameter of the cables 15 and 16 and connects together the sheaths 29 of plastic material of the cables. Moreover, the sheath 28 closes, at the outside, the grooves 23 which constitute the cavities of the joint body. If it is feared that, before the application of said sheath 28, the substantially incompressible fluid filling the grooves 23 can escape, in part, from them, there may be interposed between the plastic sheath 28 and the tubular layer 20 a taping of plastic material. Around the plastic sheath 28 of the joint there can be provided other coverings, for example, an anti-teredine protection of a type known per se if the cables connected by means of the joint have them. However, said further coverings must not provide a water-tight metal sheath nor an outer mechanically resistant armor surrounding the zone of the joint where the optical fibers and their connections are disposed, which armor is sufficient to withstand the hydrostatic pressure and tension stresses to which the cables are subjected.

The optical fibers 26 of the cables may be loosely housed within tubes filled with a substantially incompressible fluid, said tubes being received in the grooves 24 and 25, as disclosed in said copending application Ser. No. 831,650. In this case, the extremities of the tubes are disposed in the grooves 23 of the tubular layer 20, and a sleeve filled with a substantially incompressible fluid, like the sleeve 12 shown in FIG. 1, connects the extremities of the tubes and surrounds the butt-welded ends of the optical fibers.

The grooves 23 are completely filled with a substantially incompressible fluid. In the alternative, the grooves 23 are filled with the plastic material of the sheath 28 originating in this latter, a plurality of ribs whose profile has a shape complementary to that of the assembly formed by the tubes and sleeves as disclosed in said copending application Ser. No. 831,650. In this latter alternative embodiment of a joint in which the optical fibers are loosely housed in tubes connected to one another by sleeves, the radially innermost surface of the joint sheath 28 of plastic material has a configuration of nearly the same type as that of the plastic sheath 13 of the embodiment shown in FIG. 1.

In fact, in both cases, the joint sheath of plastic material surrounds the surfaces of the tubes and sleeves. This means that, by means of the joint of FIG. 2, it is possible to connected together the cables 2 and 3 of FIG. 1.

Likewise, by means of the joint of FIG. 1, it is possible to connect together the cables 15 and 16 of FIG. 2. In this latter case, the extremities of the cable optical fibers will be housed in tubes connected to one another by sleeves that bear against the sleeve covering.

From the description of the various embodiments of the joints which has been set forth and from the following considerations, it will be understood that by means of the present invention, the stated objects are achieved.

In the joints according to the present invention, the sheath is of plastic material and consequently, the sheath has no negative influence on the flexibility of the cables.

Moreover, the mechanically resistant armor of the joints, through which the mechanical connection between the cable armors is realized, is disposed at the radially innermost zone of the cable. Therefore, said armor is near the joint longitudinal axis which corresponds to the neutral axis of flexing of the joint and consequently, cannot negatively affect the flexibility of the cables.

It follows that the joints according to the present invention have the best possible flexibility and a light weight. Also, their flexibility is substantially equal to that of the cables connected by said joints.

Therefore, the presence of joints according to the present invention in optical fiber, submarine cables does not cause, in practice, discontinuities in the cable flexibility. This fact, and the light weight of the joints according to the present invention which does not cause an increase in the weight of the cables comprising said joints, facilitate the laying operation and the recovery of the cable.

Moreover, the joints according to the present invention may be quickly and easily realized due to the absence both of a watertight metal sheath and of a mechanically resistant armor disposed around the zone in which the optical fibers and their connections are disposed. The realization of such joints is, therefore, facilitated with the advantage of a greater reliability.

In spite of the absence of a water-tight metal sheath and of a mechanically resistant armor around the optical fibers, the joints of the present invention avoid the risk of transmitting mechanical stresses to the optical fibers and to their connections by reason of the hydrostatic pressure and the mechanical stresses arising during the laying operation.

In fact, the resistance to the hydrostatic pressure is assured by the fact that in the joints according to the present invention, there are no empty spaces within the sheath. Moreover, during the laying operations the tension stresses applied to the armors of the joints cannot affect the optical fibers because the optical fibers, being outside of the armor, cannot be affected by possible diametric shrinkages which may originate in said armors.

As already pointed out, in the joints according to the present invention, the sheath is of plastic material and not of metal material, a metal sheath being considered indispensable up to now in order to avoid having very small traces of water coming into contact with the optical fibers and their connections causing attenuations of the signals transmitted and embrittlements of the fibers. In spite of the use of a plastic sheath, which cannot guarantee a water impermeability equal to that of a metal sheath, in the joints according to the present invention, it has been found that the drawbacks set forth do not occur.

Moreover, in the joints according to the present invention, the presence of a plastic sheath eliminates the risks consequent to the variations of temperature to which the joint can be subjected while waiting for the laying operations. In fact, with respect to a metal sheath, a plastic sheath has a greater possibility of expansion. Therefore, because of the expansion properties of a plastic sheath, the risks of ruptures or cracks which can occur with the metal sheaths when the thermal expansions of the components enclosed in the sheath are caused by an increase of temperature, which can happen in consequence of a direct sun exposure of the joints, are no longer to be feared.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A joint between two optical fiber, submarine cables, each cable having a core comprising a centrally disposed armor capable of withstanding the tensile stresses to which the cable is subjected and a plastic sheath around said core, said plastic sheath having a plurality of longitudinal channels therein each loosely receiving at least one optical fiber and a substantially incompressible fluid filling all spaces within said sheath which are not occupied by solid material, said joint comprising:

centrally disposed connecting means mechanically interconnecting the ends of the armor of one of said cables in abutting relation with the end of the armor of the other of said cables, said connecting means forming a connection between the armors of said cables capable of withstanding the tensile stresses to which the armors are subjected;

a plastic joint sheath around said connecting means and having a plurality of channels therein which extend longitudinally thereof and which interconnect said longitudinal channels of one of said cables with said longitudinal channels of the other of said cables, each said at least one optical fiber of said one of said cables being respectively connected to each said at least one optical fiber of the other of said cables within respective ones of the channels in said plastic joint sheath, the optical fibers and their connections being loosely received in the last-mentioned said channels;

a substantially incompressible fluid filling all spaces within said plastic joint sheath which are not occupied by solid material including any spaces within said connecting means and within said channels; and said joint being without armor externally of said plastic joint sheath which, by itself, can withstand the mechanical stresses to which said joint is subjected in use.

2. A joint as set forth in claim 1 wherein each said at least one optical fiber is loosely received in a tube and the tubes of said cables extend into said joint with each tube being received in respective channels in said plastic joint sheath with the end of a tube of one cable facing the end of a tube of the other said cable and further comprising sleeves respectively surrounding the portions of the tubes with facing ends, said plastic joint sheath filling the spaces around said centrally disposed armor not occupied by said tubes and said sleeves.

3. A joint as set forth in claim 1 wherein each said at least one optical fiber is loosely received in a tube and the tubes of said cables extend into said joint with each tube being received in respective channels in said plastic joint sheath with the end of a tube of one cable facing the end of a tube of the other said cable and further comprising sleeves respectively surrounding the portions of the tubes with facing ends and a layer of plastic material intermediate said connecting means and at least said sleeves, the last-mentioned said layer contacting said sleeves and said plastic joint sheath filling any spaces around the last-mentioned said layer not occupied by said tubes and said sleeves.

4. A joint as set forth in claim 1 wherein said plastic joint sheath has an inner portion and an outer portion and said channels in said plastic joint sheath are at the outer surface of said inner portion, said outer portion closing the last-mentioned said channels, and said inner portion contacting and adhering to said connecting means.

5. A joint as set forth in claim 1 wherein said connecting means is a metal ferrule surrounding and clamped onto the end portion of said centrally disposed armor of one of said cables and the end portion of said centrally disposed armor of the other said cables.

6. A joint as set forth in claim 1 wherein said plastic joint sheath contacts said centrally disposed armor and said plastic sheath around said armor of both said cables.

7. A joint as set forth in claim 1 wherein the outer dimension of said plastic joint sheath is substantially equal to the outer dimension of said plastic sheath of at least one of said cables.

* * * * *